(12) United States Patent
Chigapov et al.

(10) Patent No.: US 7,030,054 B2
(45) Date of Patent: Apr. 18, 2006

(54) PGM-FREE WASHCOATS FOR CATALYZED DIESEL PARTICULATE FILTER APPLICATIONS

(75) Inventors: Albert N Chigapov, Aachen (DE); Alexei A Dubkov, Aachen (DE); Brendan Patrick Carberry, Aachen (DE); Robert Walter McCabe, Lathrup Village, MI (US)

(73) Assignee: Ford Global Technologlies, LLC., Dearborn, MI (US)

( * ) Notice: Subject to any disclaimer, the term of this patent is extended or adjusted under 35 U.S.C. 154(b) by 186 days.

(21) Appl. No.: 10/418,767

(22) Filed: Apr. 18, 2003

(65) Prior Publication Data

US 2004/0018939 A1    Jan. 29, 2004

(30) Foreign Application Priority Data

Apr. 18, 2002   (EP) ................................. 02100389

(51) Int. Cl.
*B01J 23/00* (2006.01)
*B01J 23/58* (2006.01)
*B01J 23/72* (2006.01)
*B01J 23/70* (2006.01)
*B01J 23/74* (2006.01)

(52) U.S. Cl. ...................... 502/302; 502/303; 502/304; 502/314; 502/317; 502/318; 502/330; 502/331; 502/338; 502/347; 502/525

(58) Field of Classification Search ........ 502/302–304, 502/314, 317, 318, 330–331, 338, 347, 525, 502/526
See application file for complete search history.

(56) References Cited

U.S. PATENT DOCUMENTS

| 4,663,305 A | * | 5/1987 | Mauldin et al. ............ 502/304 |
| 4,748,143 A | * | 5/1988 | Tabata et al. ............... 502/304 |
| 5,102,851 A | * | 4/1992 | Eri et al. ..................... 502/302 |
| 5,380,692 A | * | 1/1995 | Nakatsuji et al. ........... 502/303 |
| 5,472,673 A | | 12/1995 | Goto et al. |
| 5,473,890 A | | 12/1995 | Takeshima et al. |
| 5,687,565 A | | 11/1997 | Modica et al. |
| 5,789,339 A | * | 8/1998 | Ziebarth et al. ............ 502/303 |
| 5,792,436 A | | 8/1998 | Feeley et al. |
| 5,916,129 A | | 6/1999 | Modica et al. |
| 5,977,017 A | * | 11/1999 | Golden ....................... 502/302 |
| 6,119,450 A | | 9/2000 | Boegner et al. |
| 6,145,303 A | | 11/2000 | Strehlau et al. |
| 6,146,445 A | * | 11/2000 | Chen et al. ..................... 95/45 |
| 6,569,803 B1 | * | 5/2003 | Takeuchi .................... 502/328 |

FOREIGN PATENT DOCUMENTS

DE     4217339 A1 * 12/1993

* cited by examiner

*Primary Examiner*—Cam N. Nguyen
(74) *Attorney, Agent, or Firm*—Damian Porcari; Brooks Kushman P.C.

(57) ABSTRACT

The present invention provides new platinum group metal ("PGM") free catalytic compositions that comprise silver and/or cobalt stabilized ceria. These compositions facilitate soot oxidation during the regeneration of diesel particulate filters (DPF) thereby replacing PGM formulations. The compositions of the invention are particularly useful as washcoat compositions for DPFs as part of an automotive after-treatment system. Among the formulations tested, the silver-stabilized ceria and cobalt-stabilized ceria formulations e.g. can oxidize soot at 250–300° C. in the presence of $NO_2$ and oxygen, while silver-stabilized ceria can oxidize diesel soot even in the presence of oxygen as the sole oxidizing agent at these temperatures. A perovshite composition containing Ag—La—Mn was very active at temperatures above 300° C.

12 Claims, 9 Drawing Sheets

PGM-FREE WASHCOATS FOR CATALYZED DIESEL PARTICULATE FILTER APPLICATIONS

CROSS-REFERENCE TO RELATED APPLICATIONS

This application claims priority to European patent application no. 02100389.2 filed on Apr. 18, 2002, which is hereby incorporated by reference.

BACKGROUND OF THE INVENTION

1. Field of the Invention

In at least one embodiment, the present invention relates to a platinum-group-metal ("PGM") free catalytic compositions and the use of such compositions as a catalytically active washcoat for regenerable catalyzed diesel particulate filter applications and for automotive after-treatment systems.

2. Background Art

Environmental regulations in the United States and Europe have necessitated improvements in the removal of particles from diesel engine emissions. Typically, such particles are carbonaceous particulates in the form of soot. Presently, the most promising method for removing soot from engine exhaust is by collecting the soot using a diesel particulate filter ("DPF") followed by oxidation of the accumulated particulates at elevated temperatures.

Diesel particulate filters have been installed in urban buses and passenger cars as early as 1986. More recently, PSA launched a first European diesel passenger car having a particulate filter system. However, the regeneration by soot oxidation of diesel particulate filter requires elaborate solutions because the usually low temperatures of diesel exhaust gases are not favorable for soot oxidation. One solution is provided by supported or fuel-borne catalytic assistance in the regeneration of the DPF. A filter system which uses such a fuel-borne catalyst approach is complex and requires additional components such as a tank for fuel additives, an additive dosing system, infrastructure to refill the additive fuel tank, and the like. Moreover, fuel-borne catalysts lead to the formation of ash accumulated on the filter with gradual loss of filter soot capacity and a decrease in time between regeneration events. This phenomenon makes it necessary to change the filter after about 80K kilometers.

A soot filter which includes one or more catalysts is theoretically more attractive because it is potentially a less complex way to solve the problem of soot oxidation. However, presently available catalyst-containing filters still use PGM compositions, particularly platinum based formulations on different oxides (Oi-Uchisava J., Obuchi A., Enomoto R. Liu s., Nanba T. and Kushiyama S, Appl. Catal., B 2000, 26(1), 17–24; Oi-Uchisava J., Obuchi A., Ogata A., Enomoto R. and Kushiyama S., Appl. Catal. B 1999, 21(1), 9–17; JP 11253757).

Considerable effort has been devoted to the development of optimized PGM-containing diesel particulate filters, and in particular to Pt-containing diesel particulate filters. Engelhard has several patents on Pt-containing catalysed soot filters (WO 00/29726 A, EP 0 160 482 B1, U.S. Pat. No. 100,632, EP 0 164 881 A1, U.S. Pat. No. 5,100,632). Johnson Matthey ("JM") is producing a commercially Pt-containing catalysts for a DPF-system called "Continuously Regenerating Trap" ("CRT™"). The Continuously Regenerating Trap comprises a diesel particulate filter for soot oxidation and a platinum-based diesel oxidation catalyst ("DOC") positioned upstream of the diesel particulate filter because of $NO_2$ generated on the Pt-containing DOC (Platinum Metals Review, 45(1), 2001, 30). Although particulate filters no containing catalysts have been used since 1996, JM later included Pt- or Pd-containing oxidation catalysts within diesel particulate filters to improve soot oxidation on the filter (WO 01/12320 A). PGM containing catalyzed DPFs have as well been described by Degussa A G (U.S. Pat. No. 4,900,0517; EP 1 055 805 A1). A PGM-containing diesel particulate-$NO_x$ reduction System (DPNR) designed for simultaneous removal of soot and $NO_x$ from diesel exhaust that will be launched in vehicles in 2003 has also been described. (Automotive Engineering International/October 2000, p.119; U.S. Pat. No. 5,746,989; EP 0 758 713 B1). In addition, several other patents deal with certain improvements concerning PGM-containing particulate filters/traps (EP 0 658 369 B1; U.S. Pat. No. 5,330,945; U.S. Pat. No. 4,759,918; U.S. Pat. No. 5,610,117; U.S. Pat. No. 5,911,961; U.S. Pat. No. 6,143,691)

The PGM contained in these DPFs, usually in the form of a catalytic coating are very expensive. The world demand on PGM use in automotive exhaust after-treatment is high, while PGM supply is limited. The high cost associated with PGM loadings in these compositions and an expectedly drastically increasing world demand on PGM supplies illustrates the necessity to search for economical solutions replacing the PGM in diesel particulate filters.

Furthermore, PGM coatings are highly active in undesirable reactions such as oxidation of $SO_2$ to $SO_3$, with the following formation of sulfated ash and sulfated particulate. To minimize this side effect, catalyst suppliers try to decrease the PGM concentration in the coatings. This, however, leads to significantly lower activities in soot oxidation and thus efficiency. In addition, PGM-containing washcoats/coatings are vulnerable to poisoning by sulfur compounds, particularly in the case of low Pt- or Pd-loading, respectively. Therefore the aforementioned CRT™ and DPNR filters are economically and in terms of efficiency restricted to the use together with fuel of very low sulfur level.

Advantages of PGM-free catalysed DPFs, therefore, would be generally lower costs, as well as better specificity, avoiding undesired side reactions. Also, the application of higher concentrations of the catalytically active components may become possible, thereby increasing the sulfur resistance of the catalytic coating/washcoat. The basic problem is to find an active catalyst, which would be able to replace PGM metals.

At present, there is no commercially applicable solution available to the problem of PGM-free catalysed DPFs, though attempts employing vanadium-containing catalysed DPFs have well been described. Degussa A G mentioned the possible application of vanadium-based washcoats (U.S. Pat. No. 4,900,0517; EP 1 055 805 A1). Also, Redem Corporation disclosed DPFs comprising coatings based on vanadium compounds (U.S. Pat. No. 6,013,599). Vanadium-containing catalysts on a porous ceramic carrier have been reported by Bridgestone Corp. (U.S. Pat. No. 4,711,870).

A copper-vanadium composition was proposed for application on filters (U.S. Pat. No. 5,340,548). Similarly, a Cu/V/K/Cl— based catalytic filter was developed, which was said to be especially active in the presence of NO in the exhaust gas (P. Ciambelli, V. Palma, P. Russo and S. Vaccaro, Stud. Surf. Sci. Catal. 1998, 116, 635–645; P. Ciambelli, V. Palma, P. Russo and S. Vaccaro EUROPACAT—IV, Rimini, Italy, 1999, Book of abstracts, P/I/337; P. Ciambelli, V. Palma, P. Russo and S. Vaccaro, Appl. Catal. B 1999, 22(1), L5–L10). These catalysts, however, exhibited no noticeable activity below 400° C., furthermore, they were not stable. A catalyst of the composition $Cs_4V_2O_7$—V—AgCl—CsCl was reported to be active at about 370° C. (G. Saraggo, N. Russo. M. Ambrogio, C. Badini, V. Specchia. Catal. Today, 2000, 60, 33–41). Other Authors tested vanadium-based catalysts for soot oxidation (Carabineiro S. A., Bras Fernandes F., Ramos A. M, Vital J., Silva I. F. Catal. Today 2000, 57 (3–4), 305–312).

These vanadium-containing formulations though not being expensive, are highly toxic. Furthermore, their relatively low melting point leads to inevitable noxious vanadium emissions from the filter during running due to the high temperatures developed in the course of soot combustion. In addition, these formulations are not active at low temperatures below 350° C. Optional addition of PGM was mentioned for patents with vanadium catalysts. Among other catalysts, a very promising low temperature activity near 300° C. was reported for Cu—Nb(Ta)—K—$La_2O_3$ ($TiO_2$), but Nb and Ta also are very expensive, annihilating any economical benefit. In addition, the stability of the catalyst is low due to the presence of chlorides (A. Bellaloui, J. Varloud etc. Catal. Today, 1996, 421–425).

The combination Co and K/MgO has been found to be active near 400° C. while the combination K and Co/$La_2O_3$ has been found active near 350° C. for soot combustion in the presence of NO(C. A. Querini, L. M. Cornaglia, M. A. Ulla, E. E. Miro, Appl. Catalysis B: 1999, 20, 165–177; E. E. Miro, F. Ravelli, M. A. Ulla, L. M. Cornagli, C. A. Querini, Studies in Surface Science and Cartalysis, 130, 2000 Elsevier, 731–736). FeCrAl foam, coated with Ce—Mn/$SiO_2$—$Al_2O_3$, is reported to be active at 350° C. (EUROPACAT— IV, Rimini, Italy, Book of abstracts, W. Tylus. Metallic foamed filter-catalysts for oxidation of diesel soot, p/II/218, p.756). Molten salts catalysts have also been developed for soot combustion. However, these catalysts are not attractive due to their low stability and high corrosive activity (S. J. Jelles, B. A. A. L. van Setten, M. Makkee, J. AS. Moulijn. Appl. Catalysis B: 1999, 21, 35–49; Cat. Today 1999, 53, 613–621; Barry van Setten, Ph.D. Thesis, Delft University, 2001).

Accordingly, there exist a need in the prior art for non-PGM catalysts that oxide soot and for diesel particular filters which are active at low temperatures. In particular, there is a need for such catalysts and filters that are economical and efficient with improved ecological characteristics.

SUMMARY OF THE INVENTION

The present invention overcomes the problems encountered in the prior art by providing a platinum-group-metal ("PGM") free catalytic composition. The composition of this embodiment comprises a component selected from the group consisting of silver stabilized ceria ("$CeO_2$"), cobalt stabilized ceria, and mixtures thereof. The compositions of the present invention facilitate regeneration of diesel particulate filters. Full-size diesel particulate filters comprising these compositions as catalytically active coatings exhibit under real diesel engine conditions soot oxidation-activities comparable or better than Pt-containing DPFs with Pt-loadings of 100 g Pt/ft$^3$ (28.32 g Pt/m$^3$), catalyzing soot oxidation in an oxygen containing atmosphere at a temperature at or below 350° C. without the need of employing costly PGM, or environmentally noxious vanadium compounds. Although the mechanism by which the present invention provides improved soot oxidation, it is believed that there is a surprising synergistic effect of the components silver/ceria and/or cobalt/ceria.

The present invention also provides improved diesel particulate filters and vehicle after-treatment systems which include the platinum-group-metal compositions of the invention.

BRIEF DESCRIPTION OF THE DRAWINGS

The invention will now be described in greater detail in the following way of example only and with reference to the attached drawings, in which.

DETAILED DESCRIPTION OF THE PREFERRED EMBODIMENT(S)

Reference will now be made in detail to presently preferred compositions or embodiments and methods of the invention, which constitute the best modes of practicing the invention presently known to the inventors.

In an embodiment of the present invention a platinum-group-metal free catalytic composition is provided. The composition of this embodiment comprises a component selected from the group consisting of silver stabilized ceria, cobalt stabilized ceria, and mixtures thereof. Typically, the composition will include silver in an amount from about 5 mol. % to about 90 mol. % of the total components present in the composition. As used herein, the term "platinum-group-metal free catalytic composition" means a catalytically active composition that is "essentially platinum-group-metal free." Specifically, at most only trace amounts of platinum-group-metal are present since no such metal is intentionally added to the composition. Metals that are described are being present in the compositions as oxides may also in part be present in the metal state. The compositions of the present invention facilitate regeneration of diesel particulate filters. Full-size diesel particulate filters which include these compositions as catalytically active washcoats exhibit under real diesel engine conditions soot oxidation-activities comparable or better than Pt-containing DPFs with Pt-loadings of 100 g Pt/ft$^3$ (28.32 g Pt/m$^3$). Moreover, the compositions of the present invention are capable of catalyzing soot oxidation in an oxygen containing atmosphere at a temperature at or below 350° C. without the need of employing costly PGM, or environmentally noxious vanadium compounds.

Preferred compositions of the present invention comprise ceria and a component selected from the group of consisting of silver oxide, cobalt oxide, and mixtures thereof. Preferred compositions may further comprise one or more oxides of the group consisting of rare earth metals. These oxides tend to stabilize ceria against sintering. Suitable oxide of rare earth metals include, for example, oxides of La and Pr. Preferred compositions of the present invention may also have silver completely or partially substituted by Co and partially substituted by Cu, Mn, Fe, or Cr to improve the catalytic activities and decrease the cost. Preferably, said compositions comprise silver oxide and ceria in a molar ratio of 4:1 to 1:4, more preferably, this ratio is 3:1 to 1:3.

In another aspect of the present invention, the composition platinum-group-metal free catalytic composition preferably comprises cobalt oxide and ceria in a molar ratio of from 1.5:1 to 1:10. More preferably the molar ration of cobalt oxide to ceria is from about 1:1 to about 1:6.

In still another aspect of the present invention, another catalytically active composition is provided. This other active composition comprises Ag—La—Mn perovskite (Ag$_x$La$_1$–x Mn) wherein x is from 0.02 to 0.9. Typically, in this aspect, the perovskite has formula Ag$_x$La$_1$–x MnO$_y$, wherein x from about 0.02 to about 0.9 and y is a number that satisfies the valency of metal atoms in the perovskite so that the perovskite is neutral. In this variation, Ag and La can be partially substituted by Sr. Similarly, Mn can be partially or completely substituted by Cu, Co, Fe or Cr.

In another embodiment of the present invention, the use of a platinum-group-metal free catalytic composition forth above is provided. In this embodiment, the compositions are used as a catalytically active washcoat for regenerable catalyzed diesel particulate filter applications. Such diesel particulate filter may preferably serve as a part of an automotive after-treatment system for elimination and/or minimizing of exhaust gas emissions, particularly for directly injected fuel engine vehicles. These diesel particulate filters may serve as a filter for soot removal and coal combustion for industrial processes and stationary engines.

In yet another embodiment of the present invention, a washcoat that includes the platinum-group-metal free catalytic composition set forth above is provided. As used herein, washcoat refers to coatings, usually deposited on a substrate, of such compositions. Such washcoats exhibit optimal catalytic activity in soot oxidation. The washcoat of this embodiment may be applied for example to a substrate by the method comprising:

a) depositing on a substrate or a base coated substrate an aqueous solution containing nitrate salts corresponding to the metals in the compositions set forth above and optionally one or more organic chelating ligands such as citric acid or urea to form a precoated substrated. The specific molar ratios of the nitrate salts correspond to the desired molar ratio of the constituents of the washcoat coating;

b) drying the precoated substrate at room temperature;

c) optionally drying the precoated substrate at a temperature form about 80 105° C. to about 105° C. to form a dried substrate; and d) calcinating the dried substrate at a temperature from about 600° C. to 650° C.

In yet another embodiment of the present invention, a diesel particulate filter is provided. The diesel particulate filter of the invention comprises a substrate and a washcoat as described above. Suitable substrates include refractory inorganic oxides or ceramics, such as cordierite, mullite, silicon carbide, α-alumina, silica, and alkali and alkaline earth zirconium phosphates (NZP). The diesel particulate filter may optional include an oxide base coating on the substrate to prevent direct contact between the catalytic washcoat and the substrate. Suitable oxide base coating include oxides of a metal selected from the group consisting of Mn, Ce, Pr, La, Sr, Zr, Sm, Y, Pr, Nd, Cu, Co, Fe, Cr, Ag and mixtures thereof.

In a further refinement of this embodiment, the diesel particulate filter comprises coated exit (i.e., outlet) channels to minimize hydrocarbons ("HC") and carbon monoxide ("CO") emissions during soot combustion and filter regeneration. Such coatings are able to oxidize HC and CO at the temperatures of regeneration. The active exit coatings can include oxides of Ce, Cu, La, Sm, Mn, Ca, Sr, Mn, Co, Fe, Cr, Pr, Zr, Ag or mixtures thereof.

In still another embodiment of the present invention, an automotive after-treatment system is provided. In this embodiment, the after-treatment system comprises at least one filter as set forth above. The after-treatment system will optimally eliminate or minimize exhaust gas emissions. This will improve vehicle economy, ecology end efficiency. Such after-treatment systems are particularly advantageously applied to directly injected fuel engine vehicles. Similarly, such after-treatment systems may be used for industrial soot removal and coal combustion system for the after-treatment of industrial. A major advantage of the diesel particulate filters of the present invention are their regeneration under normal diesel engine running conditions. Regeneration can occur spontaneously when filter temperature reaches 250–325° C. during high-speed driving or can be accomplished by active control regeneration means under low-speed conditions.

Compositions, filters, and washcoats of the present invention exhibit a maximum soot oxidizing activity measured in mass conversion dM/dt in such temperature ranges, with a balance point at the lower end of the temperature regions.

The following examples illustrate the various embodiments of the present invention. Those skilled in the art will recognize many variations that are within the spirit of the present invention and scope of the claims.

EXAMPLES

A series of catalytic compositions were synthesized and evaluated regarding their activity in soot oxidation under $NO_2/O_2$ and $O_2$ atmospheric conditions using the TGA method. The most promising catalysts were then used for the preparation of full-sized diesel particulate filters (DPF) and tested for their soot oxidative activity under real diesel engine conditions. The tests were completed by a comparison with Pt-containing DPFs having a Pt-loading of 100 g Pt/ft³ (28.32 g Pt/m³). The tests revealed superior or at least comparable properties of PGM-free DPFs according to the invention with respect to soot oxidation. The most active compositions were Ag-ceria and Co-ceria, while ceria may further be stabilized by other oxides of alkaline earth and rare-earth metals. The Silver-ceria composition was also active in soot oxidation in oxygen containing atmospheres not containing nitrogen oxides at a remarkably low temperature in the range of 250 to 300° C.

Catalyst Compositions/Washcoat Formulations

PGM-free washcoat formulations (according to the present invention and reference examples) were prepared by the technique according to U.S. Pat. No. 6,139,814.

In summary, a cellulose material (Whatman® filter paper 540) was impregnated with a 0.1M solution of precursor nitrate salts, supplied by Aldrich® and Alfa® Aesar (zirconium dinitrate oxide in case of zirconia) in water followed by drying at room temperature overnight and combustion of cellulose material at 600° C. for 2 h. The pure or mixed oxides thus obtained had a mesoporosity centered around 70 to 200 Å and a high surface area in the range of 15–140 m²/g. For example, prepared $Cu_{0.15}Ce_{0.85}$ had a BET surface area of 71 m²/g, $Co_{0.15}Ce_{0.85}$ of 96 m²/g, $Ce_{0.4}Pr_{0.4}Mn_{0.2}$ of 82 m²/g, $Cu_{0.5}La_{0.5}$ of 16 m²/g, $Ag_{0.1}Sr_{0.07}La_{0.83}$ of 18 m²/g, $Cu_{0.5}Zr_{0.5}$ of 28 m²/g, $Ag_{0.15}La_{0.35}Mn_{0.5}$ of 58 m²/g, $Ag_{0.5}Ce_{0.5}$ of 76 m²/g, $Ag_{0.75}Ce_{0.25}$ of 19 m²/g, $Ag_{0.1}Ce_{0.45}Pr_{0.45}$ of 41 m²/g, $Ag_{0.25}Ce_{0.5}Zr_{0.25}$ of 142 m²/g.

The composition 1 wt % Au—$Cu_{0.15}Ce_{0.85}$ was prepared by impregnation of the Co—Ce mixed oxide prepared as described above, with an aqueous solution of hydrogen tetrachloroaurate(III), followed by drying at room temperature and subsequent calcination at 600° C. for 1 h.

TGA Evaluation

To evaluate the activity of the catalytic compositions in soot oxidation at low temperatures, two gas mixtures feeding the oxidation process were selected. As diesel exhaust contains NO, which is converted to $NO_2$ over a diesel oxidation catalyst, and $NO_2$ is active in soot oxidation, the first mixture served as a model of diesel exhaust, containing 1010 ppm $NO_2$ and 10% $O_2$ in nitrogen. Taking into account, that modern and especially new engines will release reduced amounts of $NO_x$ and that a good soot oxidative activity by oxygen of the catalyst is highly desirable, the second mixture contained only 10% $O_2$ as oxidizing agent in nitrogen. The catalytic compositions and the soot were mixed by spatula imitating the so-called "loose contact", which is typical for soot oxidation on particulate filters. All catalytic compositions were prepared by the above mentioned cellulose templating method.

The activity of the prepared catalytic compositions for soot combustion was evaluated on a flow reactor set-up coupled with a Cahn® 2000 TG (thermo gravimetric analyzer) operating in a flow mode. A powdered or "as prepared" catalytic composition sample was mixed (loose contact) by spatula with fresh diesel soot in a ratio of 5:4, typically 25 mg of catalytic composition to 20 mg of diesel soot. The mixture was then placed into the TGA reactor, and exposed at different defined temperatures (200–600° C.) to a gas flow (50 cc/min) containing: 10% $O_2/N_2$; 1000 ppm $NO_2/N_2$; or 10% $O_2$ and 1000 ppm $NO_2/N_2$. Experiments were performed using a setup based on the Cahn® 2000 microbalance. Helium UHP (100 sccm) was used to purge the microbalance chamber.

A conventional flow setup was used for the gas mixture preparation. All gases were of ultra high purity or certified calibration mixtures. Nitrogen and oxygen were additionally purified using standard columns with molecular sieves. The flow rates were controlled using Matheson® MF Controllers.

Quartz reaction vessels of tube-in-tube and side inlet/outlet design were used in the experiments performed. Quartz suspensions and pans were used for the samples. The reaction gases (nitrogen, air, $NO_2$ mixture in nitrogen) entered the reaction vessel through the side inlet, were heated by passing through the tube-in-tube zone, and went up-stream passing the sample. Far above the sample, the reaction gas joined the purge helium, and both gases exited the reaction vessel through the side outlet. A thermocouple was mounted in a special quartz tube inside the reaction vessel, being positioned as close as possible to the sample pan. The measured temperature was assumed to be a close image to the "sample temperature".

Results and Conclusion

Representative results of the TGA evaluation experiments of selected catalytic compositions are given in Table 1.

TABLE 1

The rate of soot oxidation on different catalysts, measured by TGA method (Cahn ® 2000 TG analyzer), catalyst loading 25 mg, initial soot loading 20 mg. Feed flow rate of oxidant (10% $O_2$ and 1010 ppm $NO_2$, $N_2$ balance or 10% $O_2$, $N_2$ balance) was maintained as 50 cc/min.

| $NO_2$ ppm | $O_2$ % | Catalyst, molar ratio of catalytic composition | T, [° C.] | M1, [mg] | M2, [mg] | t, [hr] | Rate, $\Box M/(M_a xt)$ [hr$^{-1}$] | ln|R| [−] |
|---|---|---|---|---|---|---|---|---|
| 1010 | 10 | Pure cordierite (125 mg) | 257 | 17,4 | 17 | 12,5 | 0,0019 | −6,287 |
|  |  |  | 280 | 17 | 16,9 | 2,5 | 0,0024 | −6,049 |
|  |  |  | 300 | 16,8 | 16,6 | 4 | 0,003 | −5,811 |

TABLE 1-continued

The rate of soot oxidation on different catalysts, measured by TGA method (Cahn ® 2000 TG analyzer), catalyst loading 25 mg, initial soot loading 20 mg. Feed flow rate of oxidant (10% $O_2$ and 1010 ppm $NO_2$, $N_2$ balance or 10% $O_2$, $N_2$ balance) was maintained as 50 cc/min.

| $NO_2$ ppm | $O_2$ % | Catalyst, molar ratio of catalytic composition | T, [° C.] | M1, [mg] | M2, [mg] | t, [hr] | Rate, $\Delta M/(M_a xt)$ [$hr^{-1}$] | ln\|R\| [—] |
|---|---|---|---|---|---|---|---|---|
| | | | 326 | 16,5 | 16,3 | 2,5 | 0,0049 | −5,323 |
| | | | 350 | 16,2 | 15,1 | 8 | 0,0088 | −4,735 |
| 1010 | 10 | $Ce_{0.4}Pr_{0.4}Mn_{0.2}$* | 257 | 13,9 | 13,1 | 1,6 | 0,02 | −3,91 |
| | | | 280 | 12,9 | 12,2 | 2 | 0,0279 | −3,58 |
| | | | 300 | 12 | 4,8 | 16,5 | 0,0519 | −2,958 |
| | | | 326 | 4,6 | 4,1 | 0,6 | 0,1916 | −1,652 |
| | | | 356 | 3,8 | 2,2 | 1,2 | 0,4444 | −0,811 |
| 0 | 10 | $Ce_{0.4}Pr_{0.4}Mn_{0.2}$* | 260 | 16,05 | 14,95 | 10 | 0,0071 | −4,948 |
| | | | 280 | 14,8 | 14,5 | 2,5 | 0,0082 | −4,805 |
| | | | 300 | 14,45 | 13,5 | 5,25 | 0,0129 | −4,347 |
| | | | 326 | 13,4 | 12,95 | 1,25 | 0,0273 | −3,6 |
| | | | 350 | 12,75 | 11,95 | 1,25 | 0,0518 | −2,96 |
| | | | 350 | 11,95 | 6,2 | 15 | 0,0422 | −3,164 |
| 0 | 10 | $K_{0.05}Sr_{0.05}La_2O_3$* | 260 | 15,6 | 15,4 | 2,5 | 0,0052 | −5,267 |
| | | | 282 | 15,35 | 15,25 | 1 | 0,0065 | −5,03 |
| | | | 300 | 15,2 | 14,9 | 2 | 0,01 | −4,608 |
| | | | 353 | 14,1 | 8,9 | 12 | 0,0377 | −3,279 |
| | | | 403 | 8,75 | 7,9 | 0,5 | 0,2042 | −1,589 |
| | | | 450 | 7,7 | 2,1 | 1 | 1,1429 | 0,1335 |
| 1010 | 10 | $K_{0.05}Sr_{0.05}La_2O_3$* | 256 | 15,6 | 15,3 | 1,25 | 0,0155 | −4,165 |
| | | | 280 | 15,3 | 15 | 2 | 0,0099 | −4,615 |
| | | | 300 | 14,85 | 14 | 12 | 0,0049 | −5,316 |
| | | | 327 | 13,9 | 13,65 | 1 | 0,0181 | −4,009 |
| | | | 350 | 13,6 | 13,2 | 0,5 | 0,0597 | −2,818 |
| 1010 | 10 | $Mn_{0.14}Mg_{0.86}$* | 255 | 15,75 | 15,4 | 1,5 | 0,015 | −4,201 |
| | | | 280 | 15,35 | 14,8 | 2 | 0,0182 | −4,004 |
| | | | 300 | 14,6 | 13 | 14 | 0,0083 | −4,794 |
| | | | 327 | 12,85 | 11,95 | 3,5 | 0,0207 | −3,876 |
| | | | 400 | 10,6 | 9,45 | 0,5 | 0,2294 | −1,472 |
| | | | 450 | 7,7 | 2 | 1,25 | 0,9402 | −0,062 |
| 0 | 10 | $Mn_{0.14}Mg_{0.86}$* | 256 | 15,6 | 15,2 | 2,5 | 0,0104 | −4,567 |
| | | | 280 | 15,1 | 14,7 | 2 | 0,0134 | −4,311 |
| | | | 302 | 14,65 | 14,3 | 1,5 | 0,0161 | −4,128 |
| | | | 327 | 14,1 | 13,9 | 0,75 | 0,019 | −3,961 |
| | | | 350 | 13,75 | 13,55 | 0,5 | 0,0293 | −3,53 |
| 1010 | 10 | $Ag_{0.15}La_{0.35}Mn_{0.5}$* | 280 | 13,9 | 12,4 | 4 | 0,0285 | −3,557 |
| | | | 300 | 12,2 | 11,4 | 1 | 0,0678 | −2,691 |
| | | | 326 | 10,9 | 0 | 7,75 | 0,2581 | −1,355 |
| 0 | 10 | $Ag_{0.15}La_{0.35}Mn_{0.5}$* | 282 | 15,3 | 14,9 | 4 | 0,0066 | −5,017 |
| | | | 300 | 14,9 | 14,6 | 2 | 0,0102 | −4,588 |
| | | | 326 | 14,6 | 14.2 | 1,4 | 0,0198 | −3,92 |
| | | | 350 | 14,1 | 9 | 12 | 0,0368 | −3,302 |
| 0 | 10 | $Cu_{0.5}La_{0.5}$* | 256 | 17,4 | 16,8 | 4,5 | 0,0078 | −4,854 |
| | | | 280 | 16,7 | 16,3 | 2,25 | 0,0108 | −4,531 |
| | | | 302 | 16,2 | 16 | 1 | 0,0124 | −4,388 |
| | | | 327 | 15,8 | 15,5 | 0,75 | 0,0256 | −3,667 |
| | | | 350 | 15,4 | 15,1 | 0,38 | 0,0525 | −2,948 |
| 1010 | 10 | $Cu_{0.5}La_{0.5}$* | 256 | 15,2 | 15,1 | 1,25 | 0,0053 | −5,244 |
| | | | 303 | 15 | 14,4 | 4,75 | 0,0086 | −4,757 |
| | | | 326 | 14,4 | 13,9 | 2 | 0,0177 | −4,036 |
| | | | 350 | 13,2 | 8,7 | 12 | 0,0342 | −3,374 |
| 1010 | 10 | $Cu_{0.15}Ce_{0.85}$* | 282 | 15,3 | 15 | 3,25 | 0,0061 | −5,101 |
| | | | 300 | 14,9 | 14,7 | 1,75 | 0,0077 | −4,864 |
| | | | 326 | 14,6 | 14,4 | 0,75 | 0,0184 | −3,996 |
| | | | 350 | 14,1 | 2,9 | 15 | 0,0878 | −2,432 |
| ??? | 10 | $Co_{0.5}Ce(Sm)_{0.5}$ | 256 | 17,4 | 17,3 | 2 | 0,0029 | −5,849 |
| | | | 280 | 17,2 | 17,1 | 2 | 0,0029 | −5,838 |
| | | | 303 | 17 | 16,3 | 12 | 0,0035 | −5,654 |
| | | | 327 | 16,2 | 16,15 | 0,5 | 0,0062 | −5,086 |
| | | | 350 | 16,05 | 15,75 | 1,4 | 0,0135 | −4,307 |
| 1010 | 10 | $Co_{0.5}Ce(Sm)_{0.5}$ | 256 | 14,5 | 13,8 | 3,5 | 0,0141 | −4,259 |
| | | | 282 | 13,5 | 10,2 | 9,8 | 0,0284 | −3,561 |
| | | | 300 | 10 | 9 | 1,2 | 0,0877 | −2,434 |
| | | | 327 | 8,9 | 7,1 | 1 | 0,225 | −1,492 |
| | | | 350 | 7,1 | 5,4 | 0,5 | 0,544 | −0,609 |
| 1010 | 10 | $Ag_{0.1}Sr_{0.07}La_{0.83}$* | 256 | 15,8 | 15,7 | 0,75 | 0,0085 | −4,772 |
| | | | 280 | 15,5 | 15,2 | 1,75 | 0,0112 | −4,495 |

TABLE 1-continued

The rate of soot oxidation on different catalysts, measured by TGA method (Cahn ® 2000 TG analyzer), catalyst loading 25 mg, initial soot loading 20 mg. Feed flow rate of oxidant (10% $O_2$ and 1010 ppm $NO_2$, $N_2$ balance or 10% $O_2$, $N_2$ balance) was maintained as 50 cc/min.

| $NO_2$ ppm | $O_2$ % | Catalyst, molar ratio of catalytic composition | T [° C.] | M1, [mg] | M2, [mg] | t, [hr] | Rate, $\Delta M/(M_a \times t)$ [$hr^{-1}$] | ln\|R\| [-] |
|---|---|---|---|---|---|---|---|---|
| | | | 300 | 15,1 | 14,1 | 11 | 0,0062 | −5,079 |
| | | | 325 | 14 | 13,7 | 1 | 0,0217 | −3,832 |
| 1010 | 10 | Pr(Sm)$_{0.4}$Mn$_{0.2}$Ce$_{0.4}$* | 256 | 15,9 | 13,5 | 15 | 0,0109 | −4,52 |
| | | | 280 | 13,3 | 11,9 | 2,7 | 0,0412 | −3,19 |
| | | | 300 | 11,9 | 10,7 | 2,2 | 0,0483 | −3,031 |
| | | | 328 | 10 | 9 | 0,5 | 0,2105 | −1,558 |
| | | | 350 | 9 | 5,2 | 1,4 | 0,3823 | −0,962 |
| 1010 | 10 | Cu$_{0.5}$Zr$_{0.5}$* | 256 | 19.2 | 18,5 | 12 | 0,0031 | −5,778 |
| | | | 280 | 18,5 | 18,3 | 1,5 | 0,0072 | −4,927 |
| | | | 300 | 18,3 | 18 | 1 | 0,0165 | −4,103 |
| | | | 326 | 17,8 | 17,4 | 1 | 0,0227 | −3,784 |
| | | | 350 | 17,2 | 16,6 | 1 | 0,0355 | −3,338 |
| 1010 | 10 | K$_{0.5}$Mn$_{0.5}$* | 326 | 15,6 | 15,4 | 1,25 | 0,0103 | −4,573 |
| | | | 350 | 15,1 | 4,9 | 7,5 | 0,136 | −1,995 |
| 0 | 10 | Hopcalite* (Ag$_{0.05}$Co$_{0.15}$Cu$_{0.3}$Mn$_{0.5}$) | 198 | 15,92 | 15,86 | 0,25 | 0,0151 | −4,193 |
| | | | 255 | 15,35 | 14,7 | 1,5 | 0,0288 | −3,546 |
| | | | 280 | 14,4 | 14,2 | 1,25 | 0,0112 | −4,493 |
| | | | 300 | 14,2 | 14 | 1 | 0,0142 | −4,256 |
| 1010 | 10 | Hopcalite* (Ag$_{0.05}$Co$_{0.15}$Cu$_{0.3}$Mn$_{0.5}$) | 280 | 14,7 | 11,8 | 10,5 | 0,0208 | −3,871 |
| | | | 300 | 11,6 | 10,1 | 2,5 | 0,053 | −2,895 |
| | | | 326 | 10,1 | 8,4 | 1,3 | 0,1414 | −1,956 |
| | | | 350 | 8 | 5,1 | 1,5 | 0,2952 | −1,22 |
| 1010 | 10 | Ag$_{0.5}$Ce$_{0.5}$ | 256 | 17,4 | 12,9 | 13,5 | 0,022 | −3,817 |
| | | | 280 | 12,4 | 9 | 4 | 0,0794 | −2,533 |
| | | | 300 | 8,6 | 6,5 | 1,5 | 0,1854 | −1,685 |
| | | | 325 | 6,3 | 3,8 | 1,3 | 0,3808 | −0,965 |
| 1010 | 10 | Ag$_{0.25}$Ce$_{0.75}$ | 254 | 16,5 | 13,9 | 15 | 0,0114 | −4,474 |
| 0 | 10 | Ag$_{0.25}$Ce$_{0.75}$ | 256 | 13,85 | 12,95 | 6 | 0,0112 | −4,492 |
| | | | 280 | 12,7 | 11,7 | 2,5 | 0,0328 | −3,418 |
| | | | 300 | 11,35 | 7,1 | 9 | 0,0512 | −2,972 |
| 0 | 10 | 1 wt % Au—Co$_{0.15}$Ce$_{0.85}$ | 257 | 17,7 | 16,7 | 5 | 0,0116 | −4,454 |
| | | | 284 | 16,5 | 16,4 | 2 | 0,003 | −5,796 |
| | | | 302 | 15,7 | 15,4 | 2,1 | 0,0092 | −4,69 |
| | | | 350 | 15,4 | 15 | 1,5 | 0,0175 | −4,043 |
| 1010 | 10 | 1 wt % Au—Co$_{0.15}$Ce$_{0.85}$ | 255 | 15,4 | 14 | 10 | 0,0095 | −4,654 |
| | | | 280 | 13,7 | 12,9 | 3 | 0,0201 | −3,91 |
| | | | 300 | 12,9 | 10 | 4 | 0,0633 | −2,76 |
| | | | 325 | 10 | 8,2 | 1,05 | 0,1884 | −1,669 |
| | | | 350 | 8.2 | 4,8 | 1,3 | 0,4024 | −0,91 |
| 1010 | 10 | Co$_{0.15}$Ce$_{0.85}$ | 256 | 16 | 15,7 | 5 | 0,0038 | −5,577 |
| | | | 280 | 15,1 | 14,3 | 3,3 | 0,0165 | −4,105 |
| | | | 300 | 14,1 | 13,1 | 1,8 | 0,0408 | −3,198 |
| | | | 325 | 13,1 | 10,5 | 1,6 | 0,1377 | −1,983 |
| | | | 350 | 10,5 | 7,9 | 0,9 | 0,314 | −1,158 |
| 1010 | 10 | Cu$_{0.13}$Ag$_{0.17}$Ce$_{0.7}$ | 254 | 16 | 14 | 12,2 | 0,0109 | −4,516 |
| | | | 282 | 13,7 | 12,7 | 2 | 0,0379 | −3,273 |
| | | | 300 | 12,1 | 9,9 | 2 | 0,1 | −2,303 |
| | | | 327 | 9,1 | 7,2 | 0,9 | 0,259 | −1,351 |
| | | | 350 | 7.2 | 4,.3 | 0,8 | 0,6304 | −0,461 |
| 1010 | 10 | Ag$_{0.1}$Ce$_{0.45}$Pr$_{0.45}$ | 256 | 15,6 | 14,2 | 9,8 | 0,0096 | −4,647 |
| | | | 280 | 14,1 | 13,3 | 1,7 | 0,0343 | −3,371 |
| | | | 300 | 13,1 | 12,2 | 1 | 0,0711 | −2,643 |
| | | | 325 | 12 | 9.5 | 1,2 | 0,1938 | −1,641 |
| | | | 353 | 9,1 | 6,1 | 0,8 | 0,4934 | −0,706 |
| 1010 | 10 | Ag$_{0.75}$Ce$_{0.25}$ | 250 | 17,9 | 12,7 | 20 | 0,017 | −4,075 |
| | | | 283 | 12,4 | 11 | 1,5 | 0,0798 | −2,529 |
| | | | 300 | 10,8 | 9,3 | 0,9 | 0,1658 | −1,797 |
| | | | 323 | 9,3 | 7,8 | 1,5 | 0,117 | −2,146 |
| | | | 353 | 7,5 | 6 | 0,25 | 0,8889 | −0,118 |

TABLE 1-continued

The rate of soot oxidation on different catalysts, measured by TGA method (Cahn ® 2000 TG analyzer), catalyst loading 25 mg, initial soot loading 20 mg. Feed flow rate of oxidant (10% $O_2$ and 1010 ppm $NO_2$, $N_2$ balance or 10% $O_2$, $N_2$ balance) was maintained as 50 cc/min.

| $NO_2$ ppm | $O_2$ % | Catalyst, molar ratio of catalytic composition | T, [° C.] | M1, [mg] | M2, [mg] | t, [hr] | Rate, $\Box M/(M_a xt)$ [hr$^{-1}$] | ln\|R\| [-] |
|---|---|---|---|---|---|---|---|---|
| 1010 | 10 | $Ag_{0.25}Ce_{0.5}Zr_{0.25}$ | 250 | 17,2 | 15,4 | 10 | 0,011 | -4,506 |
| | | | 280 | 12,7 | 12,4 | 3,4 | 0,007 | -4,957 |
| | | | 300 | 12,4 | 8,2 | 3 | 0,1359 | -1,996 |
| | | | 327 | 8,2 | 6,8 | 0,5 | 0,3733 | -0,985 |
| | | | 350 | 6,6 | 4,4 | 0,5 | 0,8 | -0,223 |

Figure 1:
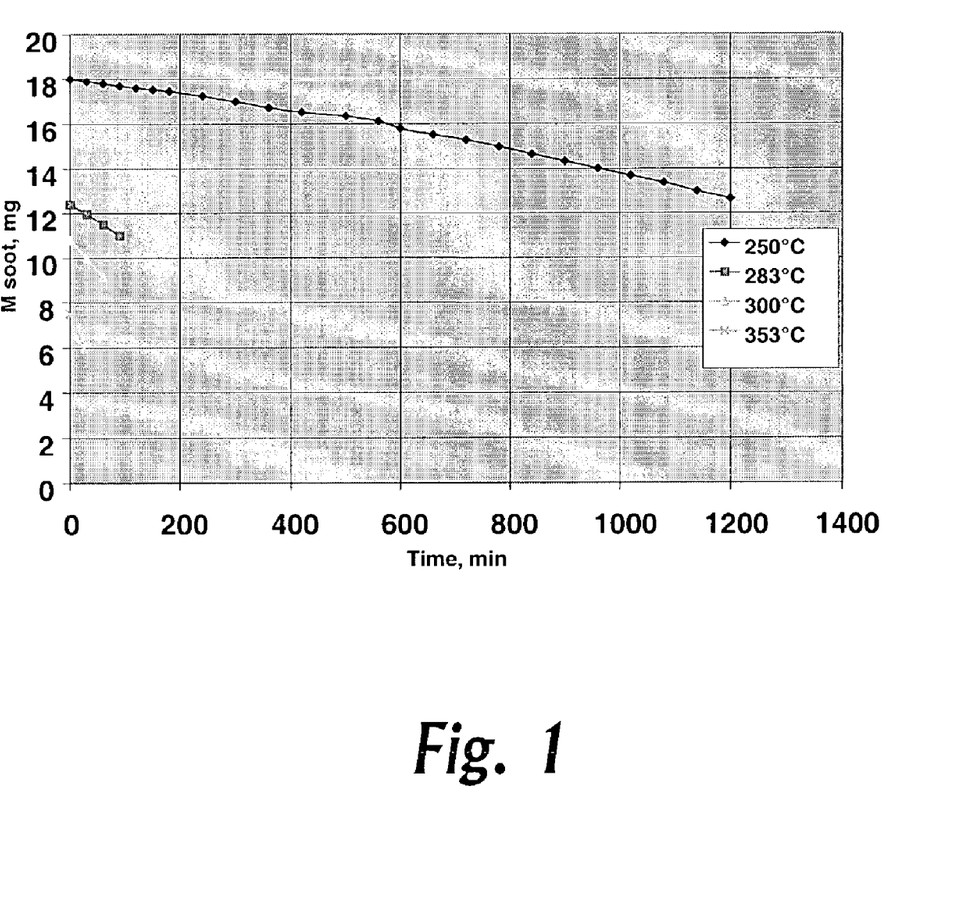
FIG. 1 is a graph of soot oxidation on $Ag_{0.75}Ce_{0.25}$ composition under $O_2$—$NO_2$ mixture.

Notes:
M1-initial mass of soot at given temperature;
M2-final mass of soot at given temperature;
$M_a$ average soot mass at given temperature, $M_a = (M1 + M2)/2$
t-time at given temperature;
*-reference examples
Rate-rate of soot oxidation The TGA experiments revealed that non-PGM catalysts are efficient in $O_2$ and $NO_2$ assisted soot oxidation thereby principally-being applicable for regenerable DPFs. Some of the evaluated catalytic compositions were even active using only oxygen as an oxidizing agent at a temperature even as low as 250 to 300° C. (Table 1). The activity of pure cordierite material, the basic substrate of diesel particular filter, with a higher loading of 125 mg instead of 25 mg of the catalytic compositions was also tested as reference material. Among the compositions tested, the most active was the Ag—$CeO_2$ binary composition. The synergetic effect between Ag and ceria is remarkable, because pure silver and ceria were practically not active in soot oxidation below 400° C. The Ag—$CeO_2$ composition was active in soot oxidation with maximum activity for $Ag_{0.75}Ce_{0.25}$ mixture in a total molar amount (Ce+Ag) of 42 to 100%, with maximum activity for the $Ag_{0.75}Ce_{0.25}$ and the $Ag_{0.5}Ce_{0.5}$ mixtures. The activity of the composition $Ag_{0.75}Ce_{0.25}$ is shown in FIG. 1 ($NO_2$ and $O_2$ mixture) at various temperatures. The sample exhibited a stable and even slightly increased activity in soot oxidation at 250° C., and soot was even more effectively oxidized at higher temperatures.

Figure 2:
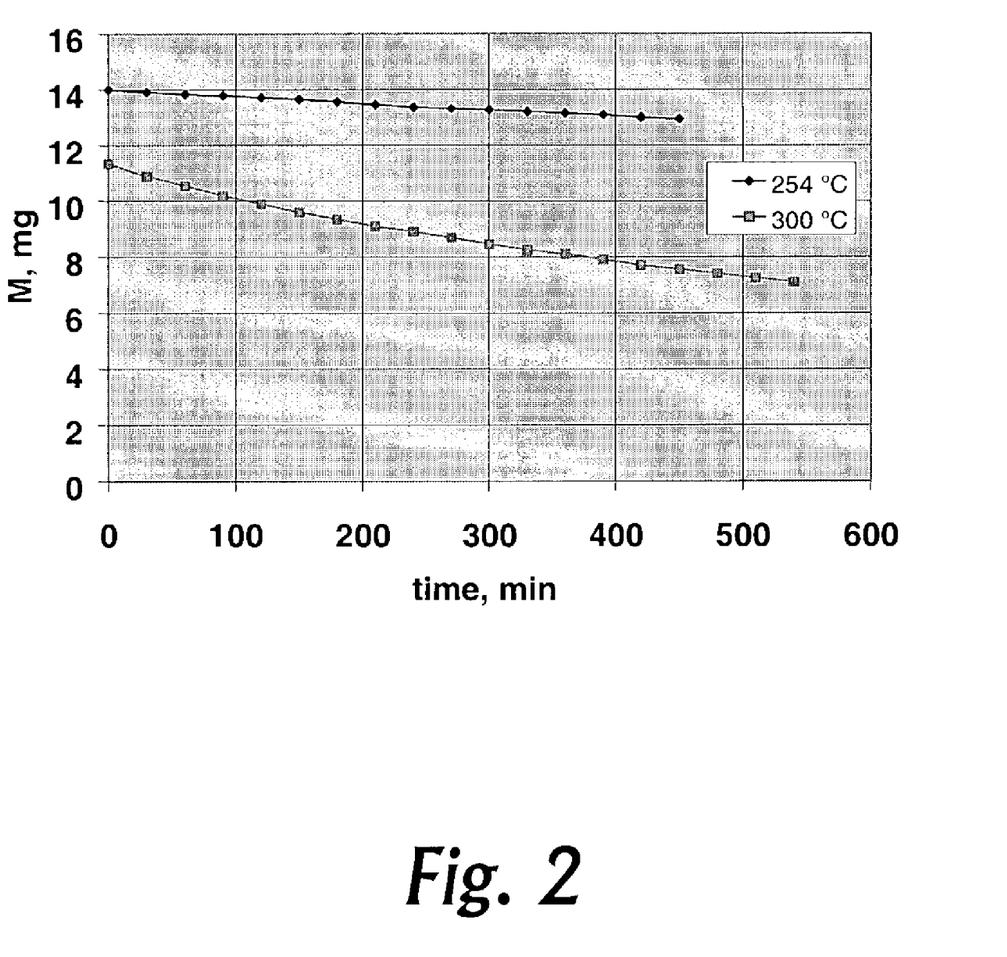
FIG. 2 is a graph of soot oxidation on $Ag_{0.25}Ce_{0.75}$ catalyst in 10%$O_2$—$N_2$ mixture.

Most surprisingly, the Ag—$CeO_2$ family was also active in soot oxidation using oxygen as the sole oxidizing agent, as can be seen from FIG. 2 by using $Ag_{0.25}Ce_{0.75}$ catalyst. Although many catalytic compositions have shown an initial activity in soot oxidation below 300° C. due to the surface oxidation, the activity generally slowed down and stopped later. In contrast, Ag—$CeO_2$ has shown a constant, though slow oxidation of soot even at 254° C., the activity increased at higher temperatures. It is suggested, that this catalytic composition is able to produce active oxygen species in the gas phase, namely atomic oxygen, which might explain its constant activity for soot oxidation also when using only oxygen as oxidant. A temperature-programmed reaction using the Ag—$CeO_2$ based composition confirmed that Ag-ceria is active in oxidation by oxygen, whereas Pt-containing catalysts are only active in $O_2$—$NO_2$ mixture, but absolutely inactive in the presence of oxygen as the sole oxidizing agent. The addition of elements which stabilize ceria against sintering, such as Sm, Y and Zr proved to be particularly beneficial for silver-ceria, addition of Nd, Ca, La, Pr, other rare earth metals, or Cu, Co, Fe, Cr and Mn was less effective, though still beneficial and without any detrimental effect with respect to the catalytic performance. Other Ag-based compositions were less effective, especially in oxidation by oxygen, but some of them, especially Ag—La—Mn perovskite were very active at temperatures above 300° C., the rate of soot oxidation on Ag—La—Mn perovskite was comparable and even higher at 325–350° C. than using Ag-ceria family.

Among non-silver compositions, only Co—$CeO_2$ compositions were effective in soot oxidation below 300° C., the activity was best for $Co_{0.5}Ce_{0.5}$ ($CoCeO_3$) composition in $NO_2$—$O_2$ mixture, but catalyst was not active in oxidation with oxygen as the sole oxidizing agent. The addition of 1 wt % gold leads to slightly increased activity for cobalt-ceria.

Diesel Particulate Filters

The most promising catalytic compositions were used for the preparation of full-size diesel particulate filters (DPFs). To do this required a preparation technique different to that described above because the DPF is a wall flow-through monolith. Coating of such supports with a catalytic layer generally imposes a problem to the experimentalists, especially when a slurry of pre-formed catalysts/catalytic composition is employed. This may result in a reduced flow through the walls of the DPFs, thus causing increased system backpressure when realised within an exhaust system. Thus, the employed technique comprised impregnating the DPF with an aqueous solution containing the catalyst's precursors, basically nitrates with optional addition of urea and/or citric acid as complexing agents to provide a homogeneous deposition of the catalyst onto the DPF. In addition, beforehand, a base coating was applied on the DPF to prevent any undesirable contact between and reaction of the catalytic composition/layer with the substrate, e.g. cordierite, and at the same time to increase the oxidative activity of the catalyst. Typically, stabilized ceria with addition of Y, Sm and/or Zr was used as said base coating of the DPFs.

Full-sized catalysed DPFs usually comprise an exit coating on the exit channels to reduce emissions of unburnt hydrocarbons and CO under passive use or during regeneration of the filter. Therefore, the sample DPFs were also equipped with exit coatings to reduce hydrocarbons and Co emissions under real working conditions.

The catalytic compositions were used to washcoat full-sized (5.66 inch×6 inch; i.e. 14.38 cm×15.24 cm) filters. Different design approaches, deposition methods, and DPF substrates were used as specified in the following. Catalysed DPFs with a Pt loading of 100 g per cubic feet (28.32 g Pt/m$^3$), and uncoated substrates were used as reference samples.

The full-size non-PGM diesel particulate filters were prepared as follows:

CPF-10. Base coating was Mn—Ce—Pr mixed oxides (Y-stabilized) with an upper catalytic washcoat of Ag—K—Ce—Sr. 14.4 g Mn(NO$_3$)$_2$×4H$_2$O, 43.3 g Ce(NO$_3$)$_3$×6H$_2$O, 43.4 g Pr(NO$_3$)$_3$×6H$_2$O and 7.1 g Y(NO$_3$)$_3$×6H$_2$O were dissolved in 300 ml of distilled water under stirring, and 18 g urea were added. The cordierite substrate (5.66" diameter× 6" length, cell density 100 cpsi, wall thickness 17 mil, i.e. 0.432 mm) was impregnated with said solution followed by drying at 105° C. overnight and calcination at 650° C. for 3 h. Then the preliminary base coated substrate was impregnated with a solution of 79.1 g AgNO$_3$, 32.6 g Ce(NO$_3$)$_3$× 6H$_2$O, 28.8 g KNO$_3$, 8.4 g Sr(NO$_3$)$_2$ in 300 ml distilled water. The impregnated filter was then dried overnight at 105° C. and was finally calcined at 650° C. for 2 h.

CPF-11. Base coating was Ag$_{0.15}$La$_{0.35}$Mn$_{0.5}$ with an upper catalytic washcoat of Ag—Cu—Ce with stabilizing addition of K and Cs. A cordierite substrate (of the same size and cell density as for CPF-10) was impregnated with a solution containing 10.2 g AgNO$_3$, 60.6 g La(NO$_3$)$_3$×6H$_2$O, 60.4 g Mn (NO$_3$)$_2$×4H$_2$O, 2.1 g Sr(NO$_3$)$_2$ in 300 ml distilled water with addition of 18 g urea. The impregnated substrate was dried overnight at 105° C. and was calcined at 650° C. for 3 h. The basecoated substrate was then washcoated with a solution of 39.5 g AgNO$_3$, 28.8 g KNO$_3$, 12 g CsNO$_3$, 15.3 g Cu(NO$_3$)$_2$×3H$_2$O, 16.3 g Ce(NO$_3$)$_3$×6H$_2$O in 325 ml distilled water, followed by drying at 80° C. overnight, and the sample was finally calcined at 650° C. for 2 h.

CPF-15. Stabilized ceria with addition of Zr, Sm and Y was selected as the base coating for a cordierite substrate (5.66" diameter×6" length, cell density 200 cpsi, wall thickness 12 mil, i.e. 0.305 mm). The catalytic layer was Ag$_{0.5}$Ce$_{0.5}$ with a ceria stabilized by addition of the same Sm, Zr and Y. First, the cordierite substrate was impregnated with a solution of 125 g Ce(NO$_3$)$_3$×6H$_2$O, 18 g ZrO(NO$_3$)$_2$, 6.4 g Sm(NO$_3$)$_3$×6H$_2$O, 2.1 g Y(NO$_3$)$_3$×6H$_2$O and 38.4 g of citric acid in 325 ml distilled water. After drying at 105° C. the substrate was calcined at 600° C. for 4 h. A catalytic washcoat was applied to the base coated substrate by impregnation with a solution of 68.5 g AgNO$_3$, 155 g Ce(NO$_3$)$_3$×6H$_2$O, 8.5 g ZrO(NO$_3$)$_2$, 12.8 g Sm (NO$_3$)$_3$×6H$_2$O and 3.0 g Y(NO$_3$)$_3$×6H$_2$O in 325 ml of distilled water. After drying at room temperature overnight, the sample was dried at 105° C. for 10 h and calcined at 600° C. for 4 h. The exit channels of the filter were impregnated with a solution of 69.6 g Ce(NO$_3$)$_3$×6H$_2$O, 5.4 g Cu(NO$_3$)$_2$×3H$_2$O, 0.51 g Ag NO$_3$, and 9 g urea in 100 ml distilled water. The solution was added to the hot filter having a temperature of 105° C. followed by drying at 80° C. The substrate was finally calcined at 650° C. for 4 h.

CPF-16. A cordierite substrate of the same size, cell density and wall thickness as for CPF-15 was base coated with CeO$_2$, obtained by impregnation of the substrate with a solution of 126 g Ce(IV) ammonium nitrate in 300 ml distilled water, followed by drying at 105° C. for 10 h and calcination at 650° C. for 2 h. The catalytic washcoat layer with the composition Ag$_{0.15}$La$_{0.3}$Sm$_{0.05}$Mn$_{0.5}$ was applied by impregnating the base coated substrate with a solution of 166.8 g La(NO$_3$)$_3$×6H$_2$O, 15.4 g Sm(NO$_3$)$_3$×6H$_2$O, 172.2 g Mn(NO$_3$)$_2$×4H$_2$O, and 30.6 g AgNO$_3$ in 350 ml distilled water, followed by drying at 50° C. overnight. A solution of 166.8 g La(NO$_3$)$_3$×6H$_2$O, 15.4 g Sm(NO$_3$)$_3$×6H$_2$O, 172.2 g Mn(NO$_3$)$_2$×4H$_2$O, 30.6 g AgNO$_3$ and 15 g urea in 275 ml distilled water was used for exit coating. After drying at 105° C. for 10 hours, the coated filter was finally calcined at 650° C. for 4 h.

CPF-17. A one-step coating employing a solution of 245 g Ce(IV) ammonium nitrate, 125 g Co(NO$_3$)$_2$×6H$_2$O, 23 g Sm(NO$_3$)$_3$×6H$_2$O in 350 ml distilled water was applied to a cordierite substrate of the same size, cell density and wall thickness as for CPF-15. Drying of impregnated cordierite was carried out at 40° C. overnight and at 100° C. for 3 h. Then the substrate was calcined at 650° C. for 2 h. Exit coating was the similar Ag—La—Mn composition as for CPF-16. 45.5 g La(NO$_3$)$_3$×6H$_2$O, 4.2 g Sm(NO$_3$)$_3$×6H$_2$O, 52.7 g Mn(NO$_3$)$_2$×4H$_2$O, 8.3 g AgNO$_3$, and 6 g urea were dissolved in 75 ml of distilled water, the solution then was applied to the exit channels of the coated substrate, followed by drying at 105° C. for 10 hours and final calcinations at 650° C. for 2 h.

CPF-18. A cordierite substrate of the same size, cell density and wall thickness as for CPF-15 was impregnated with a solution of 125 g Ce(NO$_3$)$_3$×6H$_2$O, 140 g Pr(NO$_3$)$_3$×6H$_2$O, 9.8 g Nd(NO$_3$)$_3$×6H$_2$O, 6.4 g Y(NO$_3$)$_3$× 6H$_2$O and 44 g Mn(NO$_3$)$_2$×4H$_2$O in 350 ml distilled water, followed by drying overnight at 40° C. and calcinations at 650° C. for 3 h to provide a Ce—Pr—Y—Nd—Mn base coating. The catalytic Ag—Ce—Co—Sm washcoat was applied by impregnating the base coated substrate with a solution of 34 g AgNO$_3$, 43.4 g Ce(NO$_3$)$_3$×6H$_2$O, 25.8 g Co(NO$_3$)$_2$×6H$_2$O and 4.5 g Sm(NO$_3$)$_3$×6H$_2$O in 250 ml distilled water to the top of filter, followed by drying overnight at 40° C., and calcinations at 600° C. for 3 h. An exit coating of an oxidic Ca—La composition promoted with Cu and Ag was applied by impregnating the treated substrate with a solution of 30 g Ca(NO$_3$)$_2$×4H$_2$O, 60 g La(NO$_3$)$_3$×6H$_2$O, 6 g urea, 2 g Cu(NO$_3$)$_2$×3H$_2$O and 1.4 g AgNO$_3$ in 75 ml distilled water, followed by drying at 105° C. for 10 hours and final calcinations at 650° C. for 1 h.

CPF-19. An NZP ceramic substrate (5.66" diameter×6" length, cell density 225 cpsi, wall thickness 11 mil, i.e. 0.279 mm), was used for the filter preparation. A one-step coating was performed with a catalytic washcoat layer of Ag—Ce—Co with ceria stabilized by addition of Sm and Pr oxides. The filter was impregnated with a solution of 36.8 g AgNO$_3$, 168.3 g Co(NO$_3$)$_2$×6H$_2$O, 304 g Ce(NO$_3$)$_3$×6H$_2$O, 18.3 g Sm(NO$_3$)$_3$×6H$_2$O, and 15.4 g Pr—(NO$_3$)$_3$×6H$_2$O in 450 ml distilled water. After drying at 105° C. for 10 hours the impregnated substrate was calcined at 600° C. for 4 h. As exit coating a CuCl$_2$—PdCl$_2$ composition was applied. 2 g CuCl$_2$ and 1 g PdCl$_2$ were dissolved in 50 ml distilled water. The treated substrate was impregnated with said solution, followed by drying at 105° C. and final calcination at 500° C. for 1 h.

Testing and Evaluation Under Reality Conditions on Engine

The sample filters were tested on an engine dynamometer with a Ford® Lynx 1.8L engine equipped with a commercial DOC in a close-coupled position. Stage III and Stage IV fuels with sulfur level of 350 ppm were used for comparative tests. The commercial and in-house prepared Pt-coated DPFs with Pt loading of 100 g per cubic feet (28.32 g Pt/m$^3$) were tested as reference DPFs, an uncoated DPF from cordierite was also tested.

The traditional "balance point" test approach was used for evaluation of the regeneration capability of the prepared and reference DPF samples. First, the DPFs tested were loaded with soot under the same conditions at 225° C. after preliminary cleaning to obtain clean DPFs. The test protocol included high-temperature cleaning of the DPF at 3000 rpm/160 Nm (425+/−25° C.; 230 kg/hr); soot loading at 2500 rpm/50 Nm (225° C., 160+/−20 kg/hr, soot loading rate ca. 4 g/hr, with EGR (exhaust gas recycling) on. The regeneration was carried out then at 2000 rpm and load increased by steps from 30 to 150 Nm to get pre-DPF temperature increase with 25° C. steps from 200 to 450° C. holding 15 min at each temperature; all stages described above were performed with switched off EGR. The delta P (dP) was measured for all DPFs during-loading and regeneration with analysis of emissions. This dP value serves as indicator of soot loading of the filter, because soot accumulated on the filter maximizes the resistance to gas flow through the filter and the dP. The dP increased during the loading due to the accumulation of soot, and decreased if soot collected on the filter was oxidised under regeneration conditions. The balance point temperature was considered as a temperature at which the rate of soot oxidation and accumulation are equal, as the result dP does not change at this point. The mass of soot inside the DPF and regeneration rates was evaluated using experimental data and simple pressure drop models based on the consideration that dP increases with temperature and engine load, and also the substrate properties, cell density that effect on dP. An approach similar to that described by A. G. Konstandopoulos et al. (SAE Paper 2000-01-1016) was used for estimation of mass of soot inside the DPF. Four resistances in series were assumed to contribute into total pressure drop across the DPF: (i) friction losses in the inlet channels; (ii) soot layer resistance; (iii) wall resistance; (iv) friction losses in the outlet channels. The Darcian equation was used to correlate the pressure drop with the gas velocity and wall or deposit layer properties (permeability, thickness). Assumptions on soot layer density and permeability were made using experimental and literature data (C. N. Opris et al., SAE Paper 980545). In the first step, with clean filter data, the effective permeability of the wall was calculated (no soot deposit on the filter). In the second step, with wall- and soot layer permeability, the soot layer thickness was calculated iteratively using the experimental data obtained for soot loading and regeneration. In the last step, the mass of soot was calculated on the basis of the soot layer density.

Results

Figure 3:
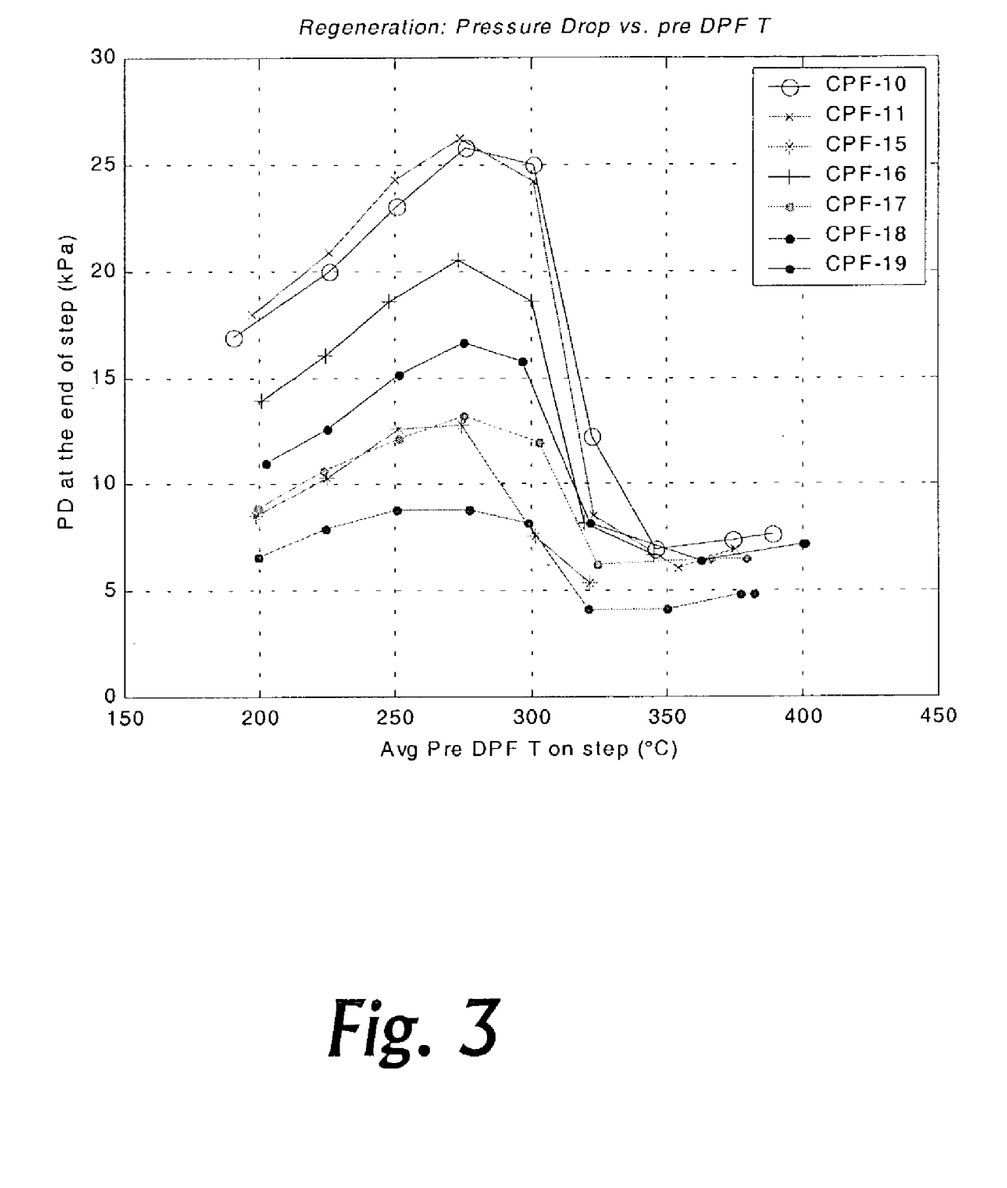
FIG. 3 is a graph of the pressure drop vs. pre-DPF temperature for the regeneration performance of PGM-free catalyzed DPFs where CPF-10 is a Ag—K—Ce containing filter where CPF-11 is a Ag—Cu—Ce—K—Cs containing filter; CPF-15 is a Ag—Ce containing filter; CPF-16 is a Ag—La—Mn perovskite containing filter; CPF-17 is a Co—Ce containing filter; CPF-18 is a Ag—Co—Ce containing filter (low catalyst loading); CPF-19—Ag—Co—Ce containing filter.
Figure 4:
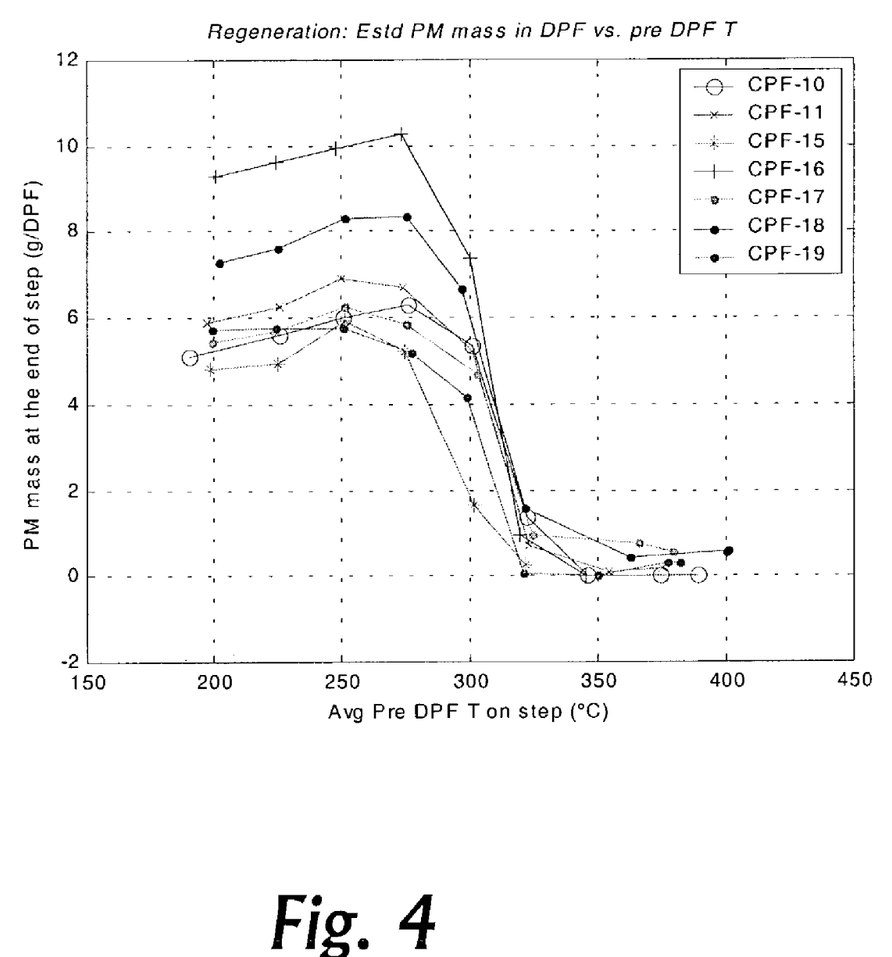
FIG. 4 is a graph of the estimated amount of soot for PGM-free catalyzed DPFs during regeneration where CPF-10 is a Ag—K—Ce containing filter, CPF-11 is a Ag—Cu—Ce—K—Cs containing filter, CPF-15 is a Ag—Ce containing filter, CPF-16 is a Ag—La—Mn perovskite containing filter, CPF-17 is a Co—Ce containing filter, CPF-18 is Ag—Co—Ce containing filter, (low catalyst loading) CPF-19—Ag—Co—Ce containing filter.

The regeneration performance of different PGM-free catalysed DPFs is shown in FIG. 3. The best regeneration properties were found for CPF-15—Ag—Ce composition. The same catalyst was the most active according to TGA evaluation. Comparably good soot oxidation properties were also found for CPF-17—Co—Ce and CPF-19—Ag—Co—Ce catalytic compositions. CPF 11 and 16 (Ag—La—Mn perovskite was less active, but revealed the good performance at 300–325° C. also in agreement with TGA results, taking into account also lower Ag loading of those filters. As shown in FIG. 4, the minimal amount of soot remaining on the filter after treatment at 300° C., was estimated for CPF-15, then for CPF-17 and CPF-19. The balance point temperature (equal rate of soot oxidation and accumulation) for those DPFs was between 250 and 275° C. and for CPF-19 even at 250° C., and the oxidation of soot was complete at 325° C. for practically all non-Pt catalysed DPF studied.

The engine bench experiments have also shown that catalyzed full-size DPFs prepared with PGM-free washcoats, based on silver or cobalt can provide comparable regeneration abilities including the level of post regeneration CO and hydrocarbon emission control with those from Pt-based formulations.

Figure 5:
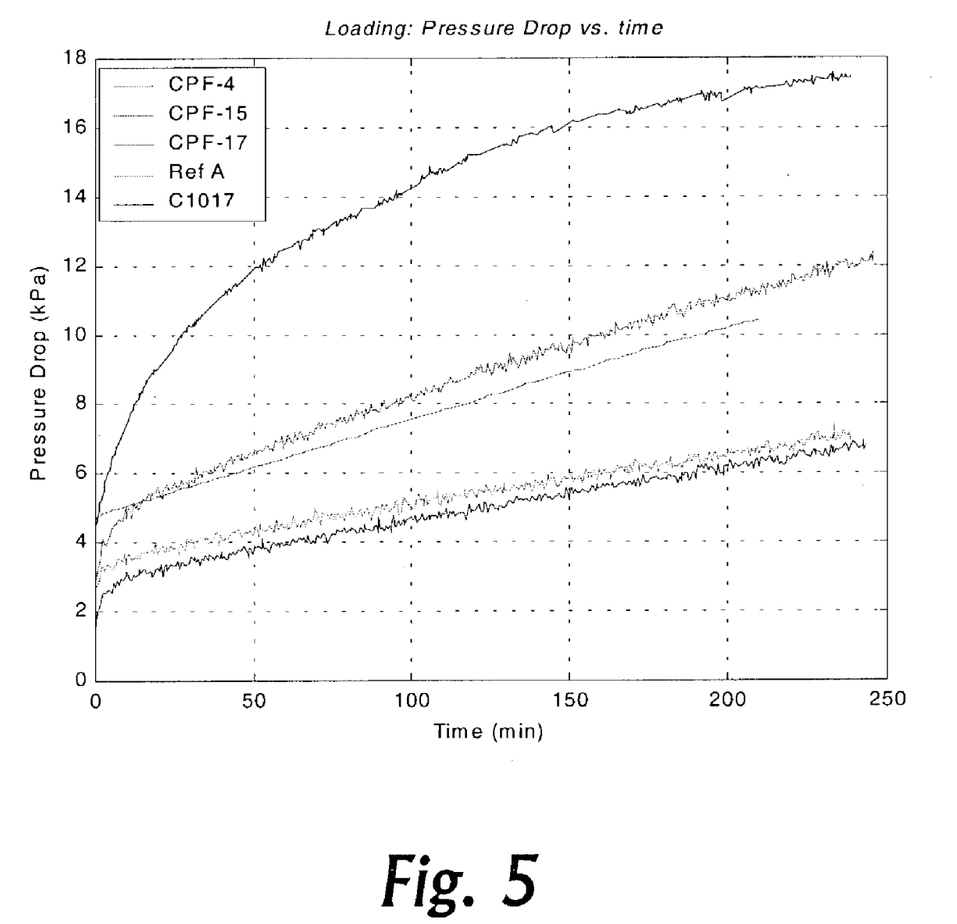
FIG. 5 is a graph of pressure drop vs. time for loading with soot of PGM-free cordierite DPFs and reference DPFs at 225° C. where CPF-4 is a Pt containing filter, in-house prepared, Pt loading 100 g/ft$^3$; Ref.A is a commercial Pt containing filter, Pt loading 100 g/ft$^3$; C1017 is a blanc cordierite; CPF-15 is Ag—Ce containing filter; and CPF-17 is a Co—Ce containing filter.

As can be seen in FIG. 5, the loading properties were better for CPF-15 and CPF-17 in comparison with Pt-containing DPFs, including-commercial, although Pt loading was extremely high with 100 g Pt per cubic foot (28.32 g Pt/m$^3$). The initial dP was lower for non-PGM DPFs. This indicates that the applied method of catalyst coating of DPF causes minimal restriction of flow through the filters. The rate of dP increase was also lower. This is believed to be due to the low oxidation of soot under loading conditions, because the temperature of loading was 225° C., while the same catalysts studied by TGA method were quite active at 250° C., the balance point temperature indicates the same. The Pt-containing DPFs were also obviously slightly active in soot oxidation under loading conditions, while the bare cordierite substrate has shown non-linear and fast increase of dP (FIG. 5).

Figure 6:
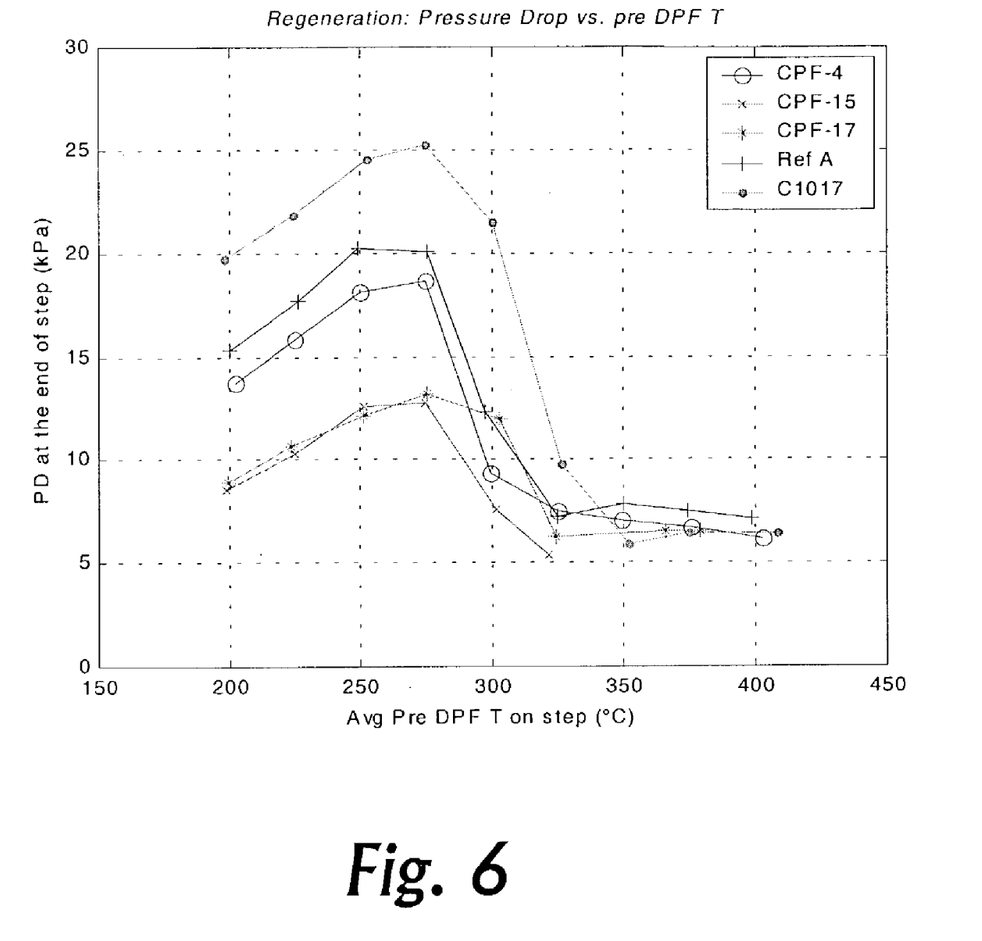
FIG. 6 is a graph of the pressure drop vs. pre-DPF temperature for the regeneration of PGM-free cordierite DPFs and reference DPFs where CPF-4 is a Pt containing filter, in-house prepared, Pt loading 100 g/ft$^3$; Ref.A is a commercial Pt containing filter, Pt loading 100 g/ft$^3$; C1017 is a blanc cordierite; CPF-15 is a Ag—Ce containing filter, and CPF-17 is a Co—Ce containing filter.

The regeneration properties of the best PGM-free DPFs were also comparable with Pt-containing elements. The Ag-ceria (CPF-15) had lower dP at all temperatures studied than Pt-containing DPFs, Co—Ce based CPF-17 had higher dP than in-house prepared Pt-containing CPF-4 at 300° C., but the pressure drop was comparable with that of the commercial DPF at this temperature, as can be seen in FIG. 6.

Figure 7:
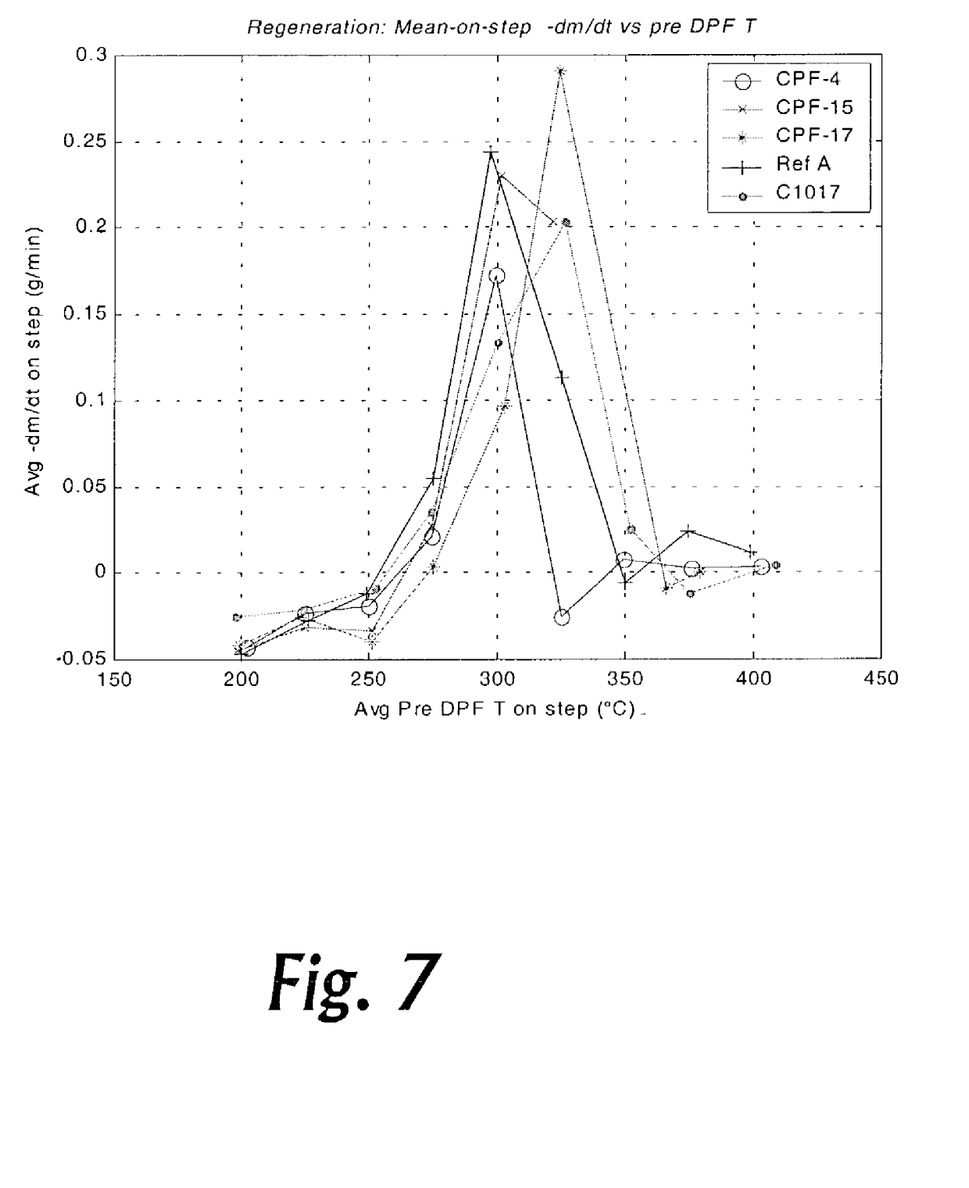
FIG. 7 is a graph of the rate of soot oxidation (−dm/dt) on PGM-free and reference DPFs versus pre-DPF T where CPF-4 is a Pt containing filter, in-house prepared, Pt loading 100 g/ft$^3$; Ref.A is a commercial Pt containing filter, Pt loading 100 g/ft$^3$; C1017 is a blanc cordierite; CPF-15 is Ag—Ce containing filter; and CPF-17 is Co—Ce containing filter.

From FIG. 7, the estimated rates of soot oxidation on non-PGM and Pt-containing DPFs were also comparable. Analyzing the data given in FIG. 7, it is necessary to take into account that the rate of soot oxidation depends on the amount of soot accumulated, and non-Pt DPFs had a low amount of soot.

Figure 8:
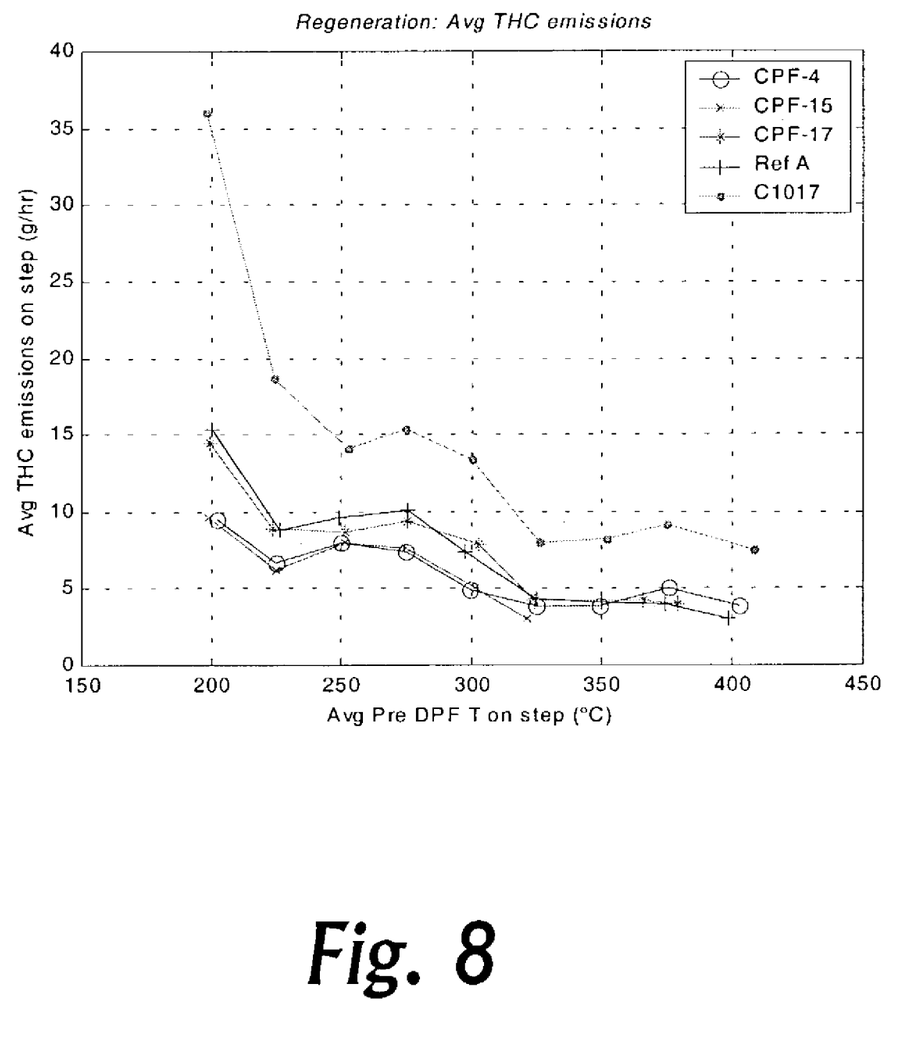
FIG. 8 is a plot of hydrocarbon emissions during regeneration where CPF-4 is a Pt containing filter, in-house prepared, Pt loading 100 g/ft$^3$; Ref.A is a commercial Pt containing filter, Pt loading 100 g/ft$^3$; C1017 is a blanc cordierite; CPF-15 is a Ag—Ce containing filter; and CPF-17 is a Co—Ce containing filter.
Figure 9:
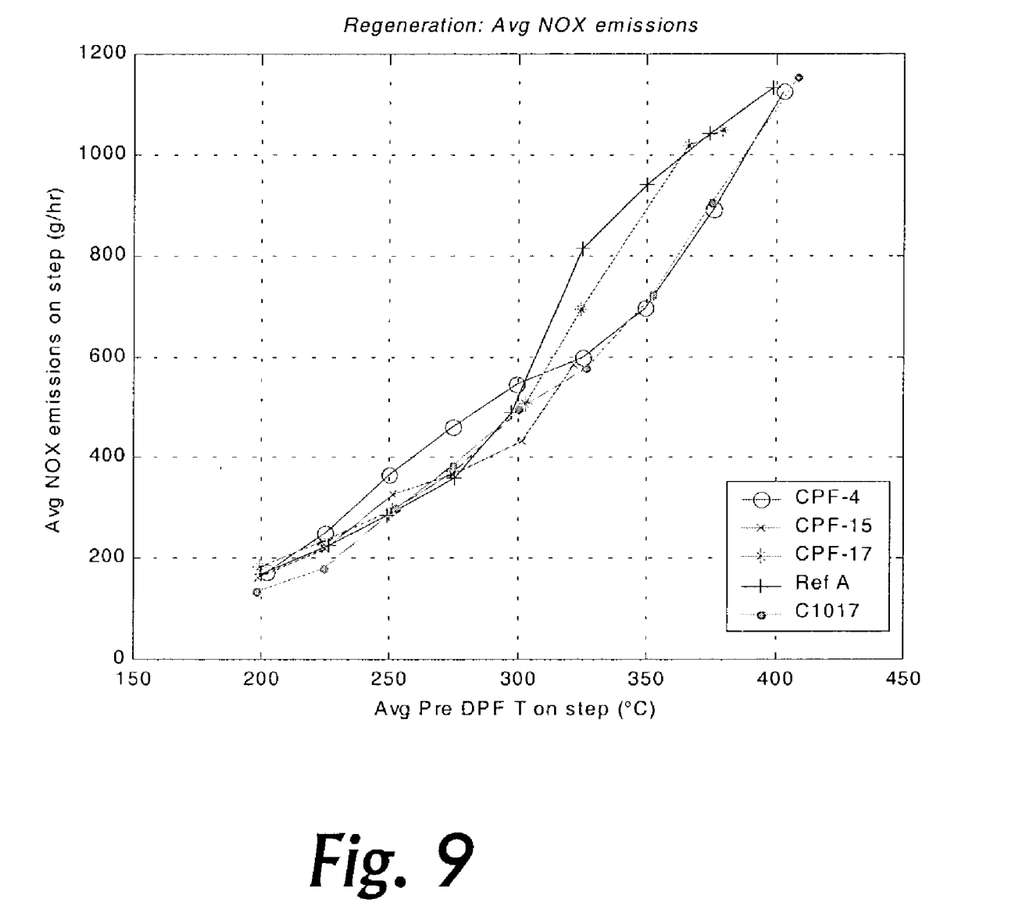
FIG. 9 is a graph of $NO_x$ emissions during regenerations where CPF-4 is Pt containing filter, in-house prepared, Pt loading 100 g/ft$^3$; Ref.A is commercial Pt containing filter, Pt loading 100 g/ft$^3$; C1017 is a blanc cordierite; CPF-15 is Ag—Ce; and CPF-17 is Co—Ce containing filter.

The level of HC and $NO_x$ emissions was also quite comparable for PGM-free and Pt-containing samples, while the uncoated DPF had higher levels of hydrocarbon emissions (FIGS. 8 and 9). The CO emissions are not shown, because only uncoated cordierite DPF had CO emissions breakthrough.

Summarizing, the PGM-free catalyzed DPFs based on Ag-stabilized ceria and Co-stabilized ceria have shown at least comparable properties in soot oxidation with Pt-containing DPFs, including commercial. Other composition based on Ag—La—Mn perovskite was very active at temperatures above 300° C. Taking into account the very appropriate pressure drop characteristics, and lower costs, these results show a promising future of PGM-free catalytic washcoats for DPF applications. The silver-ceria catalyst was also active in soot oxidation with oxygen as the sole oxidizing agent at low temperatures of 250–300° C. in contrast to PGM-based catalysts.

While embodiments of the invention have been illustrated and described, it is not intended that these embodiments illustrate and describe all possible forms of the invention. Rather, the words used in the specification are words of description rather than limitation, and it is understood-that various changes may be made without departing from the spirit and scope of the invention.

What is claimed:

1. A platinum-group-metal free catalytic composition comprising a perovskite having formula $Ag_xLa_{1-x}MnO_y$, wherein x is from about 0.02 to about 0.9 and y is a number that satisfies the valency of metal atoms in the perovskite so that the perovskite is neutral, wherein the Ag and La in the perovskite are partially substituted with Sr and the Mn in the perovskite is partially or completely substituted with Cu, Co, Fe or Cr.

2. A platinum-group-metal free catalytic composition comprising a component selected from the group consisting of silver stabilized ceria, cobalt stabilized ceria, and mixture thereof present in an amount from about 5 mol. % to about 90 mol. %.

3. The composition of claim 2 wherein the component selected from the group consisting of silver stabilized ceria, cobalt stabilized ceria, and mixture thereof is stabilized from sintering.

4. The composition of claim 2 wherein the silver stabilized ceria comprises silver oxide and ceria which are present in a molar ratio of silver oxide to ceria from about 4:1 to about 1:4.

5. The composition of claim 4 wherein the molar ratio of silver to ceria is from about 3:1 to about 1:3.

6. The composition of claim 2 wherein the cobalt stabilized ceria comprises cobalt oxide and ceria which are present in a molar ratio of cobalt oxide to ceria from about 1.5:1 to about 1:10.

7. The composition of claim 6 wherein the molar ratio of cobalt oxide to ceria is from about 1:1 to about 1:6.

8. The composition of claim 2 further comprising oxides of rare earth metals.

9. The composition of claim 8 wherein the silver stabilized ceria comprises silver oxide and ceria which are present in a molar ratio of cobalt oxide to ceria from about 4:1 to about 1:4.

10. The composition of claim 9 wherein the molar ratio of silver to ceria is from about 3:1 to about 1:3.

11. The composition of claim 2 further comprising oxides of La or Pr.

12. The composition of claim 2 wherein the silver is partially or completely substituted with Co or the silver is partially substituted with Cu, Cr, Fe and Mn.

* * * * *